(12) United States Patent
Cao et al.

(10) Patent No.: US 12,537,203 B2
(45) Date of Patent: Jan. 27, 2026

(54) LITHIUM-ION BATTERY AND APPARATUS CONTAINING SAME

(71) Applicant: JIANGSU CONTEMPORARY AMPEREX TECHNOLOGY LIMITED, Jiangsu (CN)

(72) Inventors: Jingyu Cao, Jiangsu (CN); Huihui Liu, Jiangsu (CN); Shisong Li, Jiangsu (CN); Lin Ma, Jiangsu (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 666 days.

(21) Appl. No.: 17/814,834

(22) Filed: Jul. 26, 2022

(65) Prior Publication Data

US 2022/0384817 A1    Dec. 1, 2022

Related U.S. Application Data

(63) Continuation of application No. PCT/CN2020/119689, filed on Sep. 30, 2020.

(30) Foreign Application Priority Data

Jun. 3, 2020 (CN) .......................... 202010492662.0

(51) Int. Cl.
*H01M 4/62* (2006.01)
*H01M 4/505* (2010.01)
(Continued)

(52) U.S. Cl.
CPC ........... *H01M 4/623* (2013.01); *H01M 4/505* (2013.01); *H01M 4/525* (2013.01); *H01M 4/625* (2013.01);
(Continued)

(58) Field of Classification Search
CPC ..................................................... H01M 4/623
See application file for complete search history.

(56) References Cited

U.S. PATENT DOCUMENTS 9,077,040 B2    7/2015   Honda et al.
2012/0115027 A1    5/2012   Uchida et al.
(Continued)

FOREIGN PATENT DOCUMENTS

CN    208298924 U  * 12/2018
CN    109565051 A  *  4/2019  ................ C08F 2/22
(Continued)

OTHER PUBLICATIONS

English Machine Translation of CN 208298924 U of Li (Year: 2025).*

(Continued)

*Primary Examiner* — Wyatt P McConnell
(74) *Attorney, Agent, or Firm* — K&L Gates LLP

(57) ABSTRACT

A lithium-ion battery and an apparatus containing the same are provided. In some embodiments, the lithium-ion battery includes: a positive electrode plate including a positive electrode current collector and a positive electrode active substance layer; and an electrolyte including a non-aqueous organic solvent. A low-swelling adhesive layer and an oily adhesive layer are sequentially arranged between the positive electrode current collector and the positive electrode active substance layer; the low-swelling adhesive layer includes a low-swelling binder, and the oily adhesive layer includes a first binder, where a solubility parameter $SP_1$ of the low-swelling binder is less than a solubility parameter $SP_2$ of the first binder.

17 Claims, 5 Drawing Sheets

(51) Int. Cl.
H01M 4/525 (2010.01)
H01M 10/0525 (2010.01)
H01M 10/0569 (2010.01)

(52) U.S. Cl.
CPC .......... H01M 10/0525 (2013.01); H01M 10/0569 (2013.01)

(56) References Cited

U.S. PATENT DOCUMENTS

| | | | | |
|---|---|---|---|---|
| 2017/0204308 | A1* | 7/2017 | Zhong | H01M 10/0525 |
| 2019/0140280 | A1* | 5/2019 | Zhang | H01G 11/84 |
| 2020/0161659 | A1* | 5/2020 | Li | H01M 4/668 |
| 2020/0168903 | A1* | 5/2020 | Ju | C01B 25/301 |
| 2020/0381734 | A1* | 12/2020 | Hiraishi | C08F 220/06 |
| 2020/0388851 | A1* | 12/2020 | Jin | H01M 4/667 |

FOREIGN PATENT DOCUMENTS

| | | | |
|---|---|---|---|
| CN | 109755467 A | 5/2019 | |
| CN | 111200102 A | 5/2020 | |
| CN | 111200108 A | 5/2020 | |
| CN | 111200114 A | 5/2020 | |
| CN | 111403749 A | 7/2020 | |
| JP | 2003257433 A | 9/2003 | |
| JP | 2013188924 A | 9/2013 | |
| JP | 2016219291 A | 12/2016 | |
| WO | WO-2019078685 A2 * | 4/2019 | ........... C01B 25/301 |

OTHER PUBLICATIONS

Hansen Solubility Parameters, Second Edition (Year: 2007).*
A fundamental study of Morphology Prediction for Nano and Microstructure of PVDF for Membrane Fabrication and Film Formation Applications (Year: 2018).*
High performance reactive blends composed of poly(p-phenylene sulfide) and ethylene copolymers (Year: 2011).*
International Search Report and Written Opinion received in PCT Application PCT/CN2020/119689 on Mar. 10, 2021.
The first Office Action issued in the Chinese corresponding application 202010492662.0.
Chang, Guanjun, "Solubility Parameters of Rubber (or Polymer)" issued on p. 114-123 of "Rubber Common Data Quick Reference Manual", Oct. 31, 2012.

* cited by examiner

LITHIUM-ION BATTERY AND APPARATUS CONTAINING SAME

CROSS-REFERENCE TO RELATED APPLICATIONS

This application claims priority to International Application PCT/CN2020/119689, filed Sep. 30, 2020, which claims priority to Chinese patent application No. 202010492662.0, filed Jun. 3, 2020 and entitled "LITHIUM-ION BATTERY AND APPARATUS CONTAINING SAME", which are incorporated herein by reference in their entireties.

TECHNICAL FIELD

This disclosure pertains to the field of batteries, and relates to a lithium-ion battery and an apparatus containing the same.

BACKGROUND

Lithium-ion batteries are widely applied to people's daily life due to their advantages of high energy density, long cycle life, and low environmental pollution. However, external stresses such as collision and puncture present during their use often subject batteries to internal short circuit or fire, and even cause more serious harm. Therefore, the design and development of high-safety batteries is crucial.

SUMMARY

To resolve the foregoing problems, some embodiments of this disclosure provide a lithium-ion battery and an apparatus containing the same.

According to a first aspect, this disclosure provides a lithium-ion battery, including:

a positive electrode plate including a positive electrode current collector and a positive electrode active substance layer; and an electrolyte, including a non-aqueous organic solvent;

where a low-swelling adhesive layer and an oily adhesive layer are sequentially arranged between the positive electrode current collector and the positive electrode active substance layer; and the low-swelling adhesive layer includes a low-swelling binder, and the oily adhesive layer includes a first binder, where a solubility parameter $SP_1$ of the low-swelling binder is less than a solubility parameter $SP_2$ of the first binder.

In any embodiments of this disclosure, the solubility parameter $SP_1$ of the low-swelling binder is less than a solubility parameter $SP_0$ of the non-aqueous organic solvent.

In any embodiments of this disclosure, an absolute value of a difference between the solubility parameter $SP_2$ of the first binder and the solubility parameter $SP_0$ of the non-aqueous organic solvent is $\leq 5$ $(J/cm^3)^{1/2}$.

In any embodiments of this disclosure, the solubility parameter $SP_0$ of the non-aqueous organic solvent is 20 $(J/cm^3)^{1/2}$-25 $(J/cm^3)^{1/2}$, optionally, 23 $(J/cm^3)^{1/2}$-24 $(J/cm^3)^{1/2}$.

In any embodiments of this disclosure, the solubility parameter $SP_1$ of the low-swelling binder is 13 $(J/cm^3)^{1/2}$-18 $(J/cm^3)^{1/2}$, optionally, 13 $(J/cm^3)^{1/2}$-15$(J/cm^3)^{1/2}$.

In any embodiments of this disclosure, the solubility parameter $SP_2$ of the first binder is 20 $(J/cm^3)^{1/2}$-29 $(J/cm^3)^{1/2}$, optionally, 23 $(J/cm^3)^{1/2}$-29 $(J/cm^3)^{1/2}$.

In any embodiments of this disclosure, the low-swelling binder is selected from one or more of aqueous PVDF, polyacrylic acid, polyacrylate, acrylonitrile, or copolymers thereof, and oily PVDF, polyacrylic acid, polyacrylate, acrylonitrile, polystyrene or propylene modified acrylate, or copolymers of these materials. Optionally, the low-swelling binder is selected from one or more of polyacrylic acid, polyacrylate, polystyrene or propylene modified acrylate, or copolymers of these materials.

In any embodiments of this disclosure, in the low-swelling adhesive layer, a percentage of the low-swelling binder is $\geq 40$ wt %, optionally, 40 wt %-80 wt %.

In any embodiments of this disclosure, the low-swelling adhesive layer further includes a conductive carbon material, and the conductive carbon material is selected from one or more of conductive carbon black and graphene.

In any embodiments of this disclosure, the first binder is an oily binder, and the oily binder is selected from polar group modified polyolefin fluoride and/or polyolefin chloride polymer materials, and copolymers of acrylate and acrylic acids. Optionally, the first binder is selected from carboxylic acid modified polyvinylidene fluoride PVDF and/or carboxylic acid modified polyvinylidene chloride PVDC. Optionally, the carboxylic acid is selected from acrylic acid and/or polyacrylic acid.

In any embodiments of this disclosure, the oily adhesive layer further includes a first conductive material, and the first conductive material is selected from one or more of conductive carbon black, graphene, polypyrrole, and polyaniline.

In any embodiments of this disclosure, the oily adhesive layer further includes an inorganic filler, and the inorganic filler is selected from one or more of magnesium oxide, aluminum oxide, titanium dioxide, zirconium oxide, silicon dioxide, silicon carbide, boron carbide, calcium carbonate, aluminum silicate, calcium silicate, potassium titanate, barium sulfate, lithium cobalt oxide, lithium nickel cobalt manganese oxide, lithium nickel aluminum manganese oxide, lithium iron phosphate, lithium vanadium phosphate, lithium cobalt phosphate, lithium manganese phosphate, lithium manganese ferric phosphate, lithium iron silicate, lithium vanadium silicate, lithium cobalt silicate, lithium manganese silicate, spinel-type lithium manganate, spinel-type lithium nickel manganate, lithium titanate, or these materials modified by conductive carbon coating, conductive metal coating, or conductive polymer coating.

In any embodiments of this disclosure, the positive electrode active substance layer includes a positive electrode active substance, and the positive electrode active substance is selected from lithium-containing composite metal oxides. Optionally, the positive electrode active substance is selected from one or more of lithium nickel cobalt manganese oxides and lithium nickel manganese oxides.

In any embodiments of this disclosure, the positive electrode active substance layer further includes a second binder, and the second binder is selected from optional flexible chain modified polyvinylidene fluoride and/or chlorovinylidene fluoride, where the flexible chain is long-chain alkyl or alkoxy. Optionally, the second binder is selected from one or more of optional butyl styrene modified polyvinylidene fluoride, optional polyethylene/propylene modified chlorovinylidene fluoride, polybutyl acrylate modified PVDF, and copolymers of polyvinylidene fluoride and butyl acrylate.

In any embodiments of this disclosure, a single-layer thickness $T_1$ of the low-swelling adhesive layer, a single-layer thickness $T_2$ of the oily adhesive layer, and a single-layer thickness of the positive electrode active substance layer $T_0$ satisfy the following relation: $0.01 \leq (T_1+T_2)/T_0 \leq 0.4$. Optionally, $0.015 \leq (T_1+T_2)/T_0 \leq 0.2$.

According to a second aspect, an apparatus is provided and includes the lithium-ion battery as described above. The apparatus may include a mobile phone, a notebook computer, an electric vehicle, an electric vessel, or an energy storage system. Optionally, the electric vehicle may include a hybrid electric vehicle, a plug-in hybrid electric vehicle, an electric bicycle, an electric scooter, an electric golf cart, or an electric truck.

Compared with the prior art, the technical solutions of this disclosure have at least the following beneficial effects: in the lithium-ion battery of this disclosure, the oily adhesive layer arranged between the positive electrode current collector and the positive electrode active substance layer can effectively wrap the positive electrode current collector and burrs in a process such as battery puncture, and block them docking with an electrode, thereby reducing the risk of battery internal short circuit or short-circuit heat generation, and improving safety performance of the battery. Since the low-swelling adhesive layer is arranged between the oily adhesive layer and a surface of the positive electrode current collector and the low-swelling adhesive layer has good stability in infiltration of the electrolyte, effective surface-contact sites between the oily adhesive layer and the low-swelling adhesive layer, as well as between the low-swelling adhesive layer and the surface of the positive electrode current collector can be ensured, thereby achieving high bonding force and good electron transfer network, and effectively improving electrochemical performance of the lithium-ion battery.

The apparatus of this disclosure includes the lithium-ion battery, and therefore has at least the same technical advantages as the lithium-ion battery.

DESCRIPTION OF EMBODIMENTS

To make the objectives, technical solutions, and advantages of this disclosure clearer and more comprehensible, the following further describes this disclosure in detail with reference to the accompanying drawings and embodiments. It should be understood that the specific implementations described herein are merely used to explain this disclosure but are not intended to limit this disclosure.

In the descriptions of this disclosure, unless otherwise specified and defined explicitly, the term "plurality" of indicates two or more (including two); and unless otherwise specified or described, the term "connection" should be understood in its general senses. For example, the "connection" may be a fixed connection, a detachable connection, an integrated connection, or an electrical connection, or a signal connection; or may be a direct connection or an indirect connection through an intermediate medium. A person of ordinary skills in the art can understand specific meanings of these terms in this disclosure based on specific situations.

It should be understood that the directional terms such as "upper" and "lower" described in the embodiments of this disclosure are described as seen from the angles shown in the accompanying drawings, and should not be understood as limitations to the embodiments of this disclosure. The following further describes this disclosure in detail by using specific embodiments and with reference to the accompanying drawings.

Various chemical reagents used in this disclosure are all commercially available products unless otherwise specified.

REFERENCE SIGNS

1: battery pack;
2: upper box body;
3: lower box body;
4: battery module;
5: lithium-ion battery;
51: outer package;
52: electrode assembly;
521a/521b: positive electrode active substance layer;
522a/522b: oily adhesive layer;
523a/523b: positive electrode current collector;
524: low-swelling adhesive layer; and
53: top cover assembly.

Usually, inside a battery, a positive electrode current collector in a positive electrode plate generates most heat once being in contact with a negative electrode plate due to its large resistance, which is easy to cause safety problems. Therefore, the design and development of a higher-safety positive electrode plate is crucial to improve safety performance of the battery.

Figure 1:
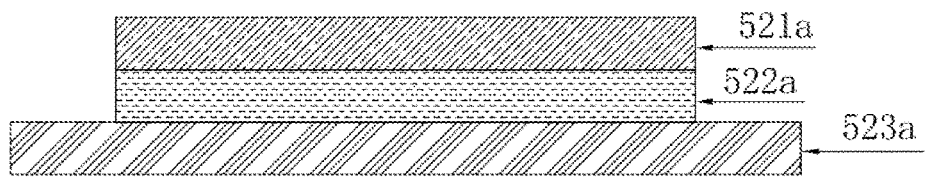
FIG. 1 is a schematic structural diagram of a conventional positive electrode plate.

Referring to FIG. 1, an oily adhesive layer 522a with good ductility is added between a positive electrode active substance layer 521a and a surface of a positive electrode current collector 523a adjacent thereto, which can effectively wrap the positive electrode current collector 523a and burrs during puncture, block them docking with an electrode, and prevent short-circuit heat generation. The oily adhesive layer 522a may be selected from polar group modified PVDF, conductive materials, and inorganic fillers, so as to satisfy high bonding force, electron transfer and stability of the adhesive layer. However, polarities of the binders used for the positive electrode active substance layer 521a and the oily adhesive layer 522a are similar, there is a similar miscibility characterization for two phases in a coating and drying process, and in the case of high-temperature drying, the positive electrode active substance layer 521a is prone to cracking, which seriously affects the coating speed and efficiency. For this problem, a modified flexible PVDF may be introduced into the positive electrode active substance layer 521a, so that a drying stress of the positive electrode active substance layer 521a may be reduced while a polarity difference with the oily adhesive layer 522a is increased. This can significantly increase the coating speed and drying temperature, thereby effectively improving production efficiency.

Flexible modification for PVDF may be carried out by modifying with non-polar groups such as a long-chain alkene group or a long-chain ester group. These non-polar groups improve mutual dissolution between the positive electrode active substance layer 521a and the oily adhesive layer 522a to a certain extent. However, an increase of a polarity difference also results in a sharp decrease of contact sites between interfaces (for example, between the positive electrode active substance layer 521a and the oily adhesive layer 522a, or between the oily adhesive layer 522a and the surface of the positive electrode current collector 523a) in a polar electrolyte environment, then causes a decrease in bonding force, electron transfer to be hindered, and a significant increase in DCR and heat generation, which seriously affects the electrochemical performance and safety performance of the battery.

The inventors have further conducted a lot of research and found that a low-swelling adhesive layer and an oily adhesive layer can be arranged in the positive electrode plate to achieve both high safety performance and electrochemical performance of the battery.

Next, various compositions, structures, parameters, materials, properties, and the like of a lithium-ion battery 5 in a first aspect of this disclosure will be described in detail.

The first aspect of this disclosure relates to the lithium-ion battery 5, including: a positive electrode plate including a positive electrode current collector 523b and a positive electrode active substance layer 521b; and an electrolyte including a non-aqueous organic solvent.

Positive Electrode Plate

The positive electrode plate used in the lithium-ion battery 5 of this disclosure includes the positive electrode current collector 523b and the positive electrode active substance layer 521b, where a low-swelling adhesive layer 524 and an oily adhesive layer 522b are sequentially arranged between the positive electrode current collector 523b and the positive electrode active substance layer 521b. The low-swelling adhesive layer 524 may be relatively close to the positive electrode current collector 523b.

Figure 2A:
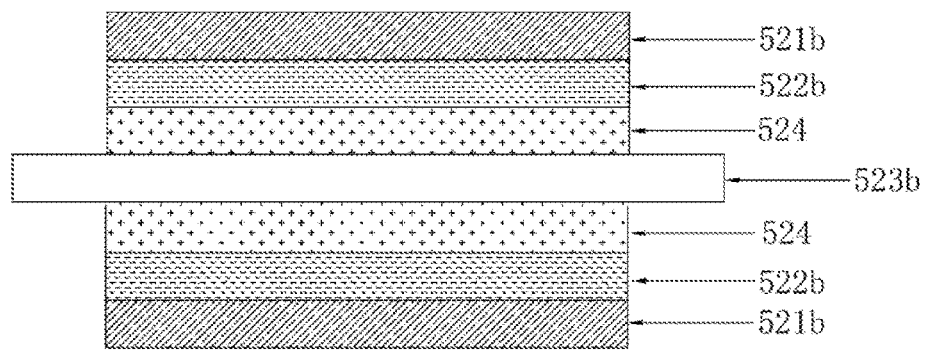
FIG. 2A is a schematic structural diagram of a positive electrode plate according to an embodiment of this disclosure.
Figure 2B:
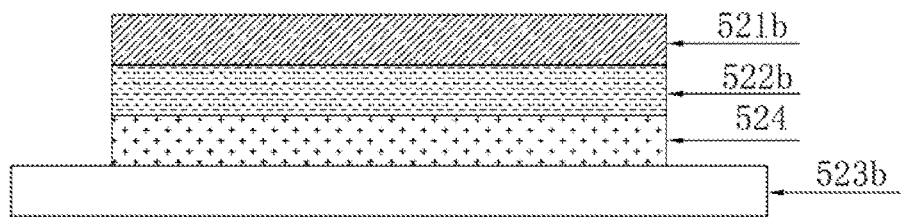
FIG. 2B is a schematic structural diagram of a positive electrode plate according to another embodiment of this disclosure.

FIG. 2A shows a schematic structural diagram of a positive electrode plate according to an embodiment of this disclosure. The positive electrode plate includes a positive electrode current collector 523b, and a low-swelling adhesive layer 524, an oily adhesive layer 522b, and a positive electrode active substance layer 521b that are sequentially arranged on two surfaces of the positive electrode current collector 523b It should be noted that FIG. 2A only shows one form of the positive electrode plate of this disclosure, that is, the low-swelling adhesive layer 524, the oily adhesive layer 522b, and the positive electrode active substance layer 521b are sequentially arranged on only two surfaces of the positive electrode current collector 523b. In other embodiments of this disclosure, for example, the low-swelling adhesive layer 524, the oily adhesive layer 522b, and the positive electrode active substance layer 521b may alternatively be sequentially arranged on one surface of the positive electrode current collector 523b. For example, FIG. 2B shows a schematic structural diagram of a positive electrode plate according to another embodiment of this disclosure.

According to the positive electrode plate of this disclosure, the oily adhesive layer 522b is arranged between the positive electrode current collector 523b and the positive electrode active substance layer 521b, the positive electrode current collector 523b and burrs can be effectively wrapped in a process such as puncture of the battery, and block them docking with an electrode, thereby reducing the risk of battery internal short circuit or short-circuit heat generation, and improving the safety performance of the battery. In addition, in an electrolyte soaking environment, due to the presence of the low-swelling adhesive layer 524 between the oily adhesive layer 522b and the surface of the positive electrode current collector 523b, the original point-contact mode between the two layers is changed, so that contact sites are increased by means of surface contact to form effective binding, while a good electron transfer network is ensured, thereby effectively improving the electrochemical performance of the lithium-ion battery 5.

Positive Electrode Current Collector

There is no special requirements for the positive electrode current collector 523b used in this disclosure. A conventional positive electrode current collector 523b used for the lithium-ion battery 5 may be selected according to actual needs provided that the technical solutions of this disclosure can be realized with it. In an embodiment of this disclosure, the positive electrode current collector 523b may generally a structure or component that can collect current, for example, the positive electrode current collector 523b may be made of various materials suitable to be used as a positive electrode current collector 523b of an electrochemical energy storage apparatus in the art. For example, the positive electrode current collector 523b may include, but is not limited to, a metal foil, and more specifically, may include, but is not limited to, a nickel foil or an aluminum foil.

Low-Swelling Adhesive Layer

In an embodiment, the low-swelling adhesive layer 524 used for the positive electrode plate of this disclosure includes a low-swelling binder. For example, a solubility parameter $SP_1$ of the low-swelling binder is less than a solubility parameter $SP_0$ of a non-aqueous organic solvent.

In an embodiment, the solubility parameter $SP_1$ of the low-swelling binder is 13 $(J/cm^3)^{1/2}$-18 $(J/cm^3)^{1/2}$. For example, $SP_1$ may be 13 $(J/cm^3)^{1/2}$-15 $(J/cm^3)^{1/2}$, 13 $(J/cm^3)^{1/2}$-14 $(J/cm^3)^{1/2}$, 14 $(J/cm^3)^{1/2}$-18 $(J/cm^3)^{1/2}$, 14$(J/cm^3)^{1/2}$-15 $(J/cm^3)^{1/2}$, or 16 $(J/cm^3)^{1/2}$-18 $(J/cm^3)^{1/2}$.

In an embodiment, the low-swelling binder may be selected from one or more of aqueous polyvinylidene fluoride (PVDF), polyacrylic acid, polyacrylate, acrylonitrile, or copolymers thereof, and oily PVDF, polyacrylic acid, polyacrylate, acrylonitrile, polystyrene or propylene modified acrylate, or copolymers of these materials. For example, the low-swelling binder may be selected from one or more of polyacrylic acid, polyacrylate, polystyrene or propylene modified acrylate, or copolymers of these materials. The polystyrene or propylene modified acrylate includes one or more of polystyrene modified acrylate, polypropylene modified acrylate, and polystyrene and polypropylene modified acrylate.

In an embodiment, a relative molecular mass of the low-swelling binder may be 100,000-1,000,000, for example, may be 300,000-800,000, 300,000-500,000, or 500,000-800,000.

According to this disclosure, a relative molecular mass of a polymer is a weight-average relative molecular mass, which may be measured in a conventional manner in the art. For example, a method of small angle laser light scattering. This technique is well known to a person skilled in the art.

In an embodiment, the low-swelling binder is polyacrylic acid, with a relative molecular mass of 300,000 and a solubility parameter of 14 $(J/cm^3)^{1/2}$-15 $(J/cm^3)^{1/2}$.

In an embodiment, the low-swelling binder is polyacrylate, with a relative molecular mass of 500,000 and a solubility parameter of 16 $(J/cm^3)^{1/2}$-18 $(J/cm^3)^{1/2}$.

In an embodiment, the low-swelling binder is polystyrene or propylene modified acrylate, with a relative molecular mass of 800,000 and a solubility parameter of 13 $(J/cm^3)^{1/2}$-14 $(J/cm^3)^{1/2}$.

In an embodiment, a percentage of the low-swelling binder in the low-swelling adhesive layer 524 is ≥40 wt %, for example, may be 40 wt %-80 wt %, 40 wt %-60 wt %, or 60 wt %-80 wt %.

In an embodiment, the low-swelling adhesive layer 524 further includes a conductive carbon material. The conductive carbon material may be selected from one or more of conductive carbon black and graphene. The conductive carbon black may be known in the art and include, for example, acetylene black. Optionally, a percentage of the conductive carbon material in the low-swelling adhesive layer 524 is 20 wt %-60 wt %, for example, may be 20 wt %-40 wt %, or 40 wt %-60 wt %.

In an embodiment, a single-layer thickness $T_1$ of the low-swelling adhesive layer 524 is 0.1 μm-5 μm, for example, may be 0.1 μm-3 μm, 0.1 μm-2 μm, 0.1 μm-1 μm, 100 μm-990 μm, 150 μm-900 μm, 200 μm-800 μm, 1 μm-5 μm, 1 μm-3 μm, 1 μm-2 μm, 2 μm-5 μm, or 2 μm-3 μm.

In an embodiment, a common organic solvent, including but not limited to, for example, one or more of N-methylpyrrolidone, carbon tetrachloride, acetone, ethylene carbonate (EC), and diethyl carbonate (DEC), is used as a solvent. At room temperature, the low-swelling binder and the conductive carbon material are added in a suitable feeding ratio, and a mechanical stirring device is used to disperse and stir evenly to obtain a low-swelling slurry with good dispersibility, and then the slurry is applied to a surface of the positive electrode current collector 523b. The slurry is dried in an oven, followed by removing of the solvent (for example, but is not limited to, 100° C., 2h). After the solvent is completely evaporated, a low-swelling adhesive film can be obtained. The low-swelling adhesive film is soaked in the electrolyte at a suitable temperature (for example, 70° C.) and monitored for 1 week. It is found that the mass and volume swelling rate of the low-swelling adhesive film are both less than 10%, indicating a good low-swelling effect.

Oily Adhesive Layer

In an embodiment, the oily adhesive layer 522b used for the positive electrode plate of this disclosure includes a first binder. For example, an absolute value of a difference between the solubility parameter $SP_2$ of the first binder and the solubility parameter $SP_0$ of the non-aqueous organic solvent is ≤5 $(J/cm^3)^{1/2}$.

In an embodiment, the solubility parameter $SP_2$ of the first binder is 20 $(J/cm^3)^{1/2}$-29$(J/cm^3)^{1/2}$, for example, may be 20 $(J/cm^3)^{1/2}$-27 $(J/cm^3)^{1/2}$, 20 $(J/cm^3)^{1/2}$-24 $(J/cm^3)^{1/2}$, 20 $(J/cm^3)^{1/2}$-22 $(J/cm^3)^{1/2}$, 23 $(J/cm^3)^{1/2}$-29 $(J/cm^3)^{1/2}$, 23 $(J/cm^3)^{1/2}$ 24 $(J/cm^3)^{1/2}$, or 27 $(J/cm^3)^{1/2}$-29 $(J/cm^3)^{1/2}$.

In an embodiment, the solubility parameter $SP_2$ of the first binder is greater than the solubility parameter $SP_1$ of the low-swelling binder. In other words, a solubility parameter $SP_1$ of the low-swelling binder is less than the solubility parameter $SP_2$ of the first binder. The solubility parameter $SP_2$ of the first binder and the solubility parameter $SP_1$ of the low-swelling binder are both relative to the non-aqueous organic solvent of the electrolyte.

In an embodiment, the first binder is an oily binder. For example, the oily binder may be selected from polar group modified polyolefin fluoride and/or polyolefin chloride polymer materials, and copolymers of acrylate and acrylic acid.

In an embodiment, the oily binder may be selected from one or more of carboxylic acid modified PVDF, acrylic acid modified PVDF, polyacrylic acid modified PVDF, polyvinylidene chloride (PVDC), carboxylic acid modified PVDC, acrylic acid modified PVDC, PVDF copolymers, and PVDC copolymers. In an example, the oily binder may be selected from one or more of acrylic acid modified PVDF and polyacrylic acid modified PVDF.

In an embodiment, a relative molecular mass of the oily binder may be 300,000-5,000,000, for example, may be 800,000-1,300,000, 800,000-1,000,000, 1,000,000-1,300,000, or 1,000,000-5,000,000.

In an embodiment, the oily binder is polyacrylic acid modified PVDF, with a relative molecular mass of 1,000,000 and a solubility parameter of 23 $(J/cm^3)^{1/2}$-24 $(J/cm^3)^{1/2}$.

In an embodiment, the oily binder is polyacrylic acid modified PVDF, with a relative molecular mass of 1,300,000 and a solubility parameter of 20 $(J/cm^3)^{1/2}$-22 $(J/cm^3)^{1/2}$.

In an embodiment, the oily binder is polyacrylic acid modified PVDF, with a relative molecular mass of 800,000 and a solubility parameter of 27 $(J/cm^3)^{1/2}$-29 $(J/cm^3)^{1/2}$.

In an embodiment, a percentage of the first binder in the oily adhesive layer 522b is 40 wt %-75 wt %, for example, may be 40 wt %-60 wt %, 40 wt %-50 wt %, 50 wt %-75 wt %, 50 wt % %-60 wt %, or 60 wt %-75 wt %.

In an embodiment, the oily adhesive layer 522b further includes a first conductive material. The first conductive material may be selected from one or more of carbon-based conductive materials and conductive polymers. In an example, the first conductive material may be selected from one or more of conductive carbon black, graphene, polypyrrole, and polyaniline. The conductive carbon black may be known in the art and include, for example, acetylene black.

In an embodiment, a percentage of the first conductive material in the oily adhesive layer 522b is 20 wt %-55 wt %, for example, may be 20 wt %-40 wt %, 20 wt %-30 wt %, 30 wt %-45 wt %, or 40 wt %-55 wt %

In an embodiment, the oily adhesive layer 522b further includes an inorganic filler. For example, the inorganic filler may be selected from at least one of magnesium oxide, aluminum oxide, titanium dioxide, zirconium oxide, silicon dioxide, silicon carbide, boron carbide, calcium carbonate, aluminum silicate, calcium silicate, potassium titanate, barium sulfate, lithium cobalt oxide, lithium nickel cobalt manganese oxide, lithium nickel aluminum manganese oxide, lithium iron phosphate, lithium vanadium phosphate, lithium cobalt phosphate, lithium manganese phosphate, lithium manganese ferric phosphate, lithium iron silicate, lithium vanadium silicate, lithium cobalt silicate, lithium manganese silicate, spinel-type lithium manganate, spinel-type lithium nickel manganate, lithium titanate, or these materials modified by conductive carbon coating, conductive metal coating, or conductive polymer coating.

Optionally, the inorganic filler may be selected from one or more of alumina, titania, zirconia, silica, lithium iron phosphate, and carbon-coated lithium iron phosphate. Optionally, the inorganic filler may be selected from one or more of alumina, titania, zirconia, and silica.

In an embodiment, a percentage of the inorganic filler in the oily adhesive layer 522b is 5 wt %-40 wt %, for example, may be 5 wt %-20 wt %, 5 wt %-10 wt %, 10 wt %-40 wt %, 10 wt %-20 wt %, or 20 wt %-40 wt %.

In an embodiment of this disclosure, a single-layer thickness $T_2$ of the oily adhesive layer 522b is 3 μm-15 μm, for example, may be 3 μm-10 μm, 3 μm-7 μm, 3 μm-5 μm, 5 μm-15 μm, 5 μm-10 μm, 5 μm-7 μm, or 7 μm-15 μm.

The oily adhesive layer 522b and the low-swelling adhesive layer 524 used for the positive electrode plate of this disclosure may be distinguished and selected from the following two aspects: (1) Particle size. The low-swelling adhesive layer 524 has a thickness of nanometer to submicrometer level (for example, 100 μm-1 μm, 100 μm-2 μm, 100 μm-3 μm, 100 μm-5 μm, 100 μm-990 μm, 150 μm-900 μm, or 200 μm-800 nm). However, due to introduction of the inorganic filler in the oily adhesive layer 522b, the thickness of the adhesive layer is generally at a granularity of micron. (2) Solubility parameter. A solubility parameter is a parameter representing a polymer-solvent interaction. It can be quantitatively represented by cohesive energy. The cohesive energy per unit volume is called a cohesive energy density, and a square root of the cohesive energy density is called the solubility parameter. The solubility parameter may be used as a good indicator to measure whether two materials are miscible. When solubility parameters of the two materials are similar, the two materials can be miscible with each other and have good miscibility. Usually, solubility parameters of liquids can be obtained from their heat of vaporization. Solubility parameters of polymers can be obtained from cross-linked polymer swelling experiment or linear polymer dilute solution viscosity measurement. A solubility parameter of a solvent that can maximize a swelling rate or intrinsic viscosity of a polymer is the solubility parameter of the polymer. In this disclosure, the solubility parameter of the binder may be determined referring to a turbidimetric titration method.

Generally, a solubility parameter of a mixed solvent may be calculated according to the following formula (1):

$$\delta = \sum_{i=1}^{n} \delta_i \times \varphi_i \tag{1}$$

where δ is the solubility parameter of the mixed solvent, $\delta_i$ is the solubility parameter of a component, $\varphi_i$ is the volume fraction of the component, and n is an integer greater than or equal to 2.

For example, the mixed solvent is a three-component solvent, and its solubility parameter may be calculated according to the following formula (1-1):

$$\delta = \delta 1 \times \varphi 1 + \delta 2 \times \varphi 2 + \delta 3 \times \varphi 3 \tag{1-1}$$

where δ is the solubility parameter of the mixed solvent, $\delta_1$ is the solubility parameter of a first component, $\varphi_1$ is the volume fraction of the first component, $\delta_2$ is the solubility parameter of a second component, $\varphi_2$ the volume fraction of the second component, $\delta_3$ is the solubility parameter of a third component, and $\varphi_3$ is the volume fraction of the third component. δ of common solvents such as ethylene carbonate (EC), polycarbonate (PC), and diethyl carbonate (DEC) are respectively 29.4 $(J/cm^3)^{1/2}$, 14.5 $(J/cm^3)^{1/2}$, and 20.3 $(J/cm^3)^{1/2}$. In this disclosure, the solubility parameter $SP_0$ of the non-aqueous organic solvent of the lithium-ion electrolyte is 20 $(J/cm^3)^{1/2}$-25 $(J/cm^3)^{1/2}$.

According to the principle of similar miscibility, for different binder types, the low-swelling adhesive layer 524 used for the positive electrode plate of this disclosure usually selects the low-swelling binder having the solubility parameter $SP_1$ of 13 $(J/cm^3)^{1/2}$-18 $(J/cm^3)^{1/2}$. In an embodiment of this disclosure, the low-swelling binder may be selected from, including but not limited to, for example, one or more of aqueous PVDF, polyacrylic acid, polyacrylate, acrylonitrile, or copolymers thereof, and oily PVDF, polyacrylic acid, polyacrylate, acrylonitrile, polystyrene or propylene modified acrylate, or copolymers of these materials.

The solubility parameters of the low-swelling adhesive layer 524 and the non-aqueous organic solvent are quite different. In an electrolyte infiltration environment, the low-swelling adhesive layer 524 has a small degree of swelling and high stability. For a system of the oily adhesive layer 522b, polar groups and structural fragments with larger solubility parameters are usually introduced for copolymerization, to expand the contact area between the first binder and the positive electrode active substance, the second conductive material, and the positive electrode current collector 523b, thereby improving bonding force and electrical conductivity. For the oily adhesive layer 522b of this disclosure, the first binder, having the solubility parameter $SP_2$ of 20 $(J/cm^3)^{1/2}$-29 $(J/cm^3)^{1/2}$, includes, but is not limited to, for example, polar group modified polyvinylidene fluoride (commercially available, with a relative molecular mass of 1,000,000-5,000,000). The introduction of polar groups increases the solubility parameter of the oily adhesive layer 522b to make the oily adhesive layer 522b have a small difference with the solubility parameter of the electrolyte, and accordingly, the oily adhesive layer 522b exhibits high swelling property and the like in the electrolyte.

Positive Electrode Active Substance Layer

In an embodiment, the positive electrode active substance layer 521b used for the positive electrode plate of this disclosure contains a positive electrode active substance. For example, the positive electrode active substance is selected from lithium-containing composite metal oxides. In an example, the positive electrode active substance is selected from one or more of lithium nickel cobalt manganese oxides and lithium nickel manganese oxides.

In an embodiment of this disclosure, the lithium-containing composite metal oxides include, but are not limited to, $LiCoO_2$, $LiNiO_2$, $LiMn_2O_4$, lithium nickel cobalt manganese oxides, or lithium nickel manganese oxides. In an embodiment of this disclosure, the lithium nickel cobalt manganese oxides include but are not limited to $LiN_{i0.8}Co_{0.1}Mn_{0.1}O_2$. In an embodiment of this disclosure, the lithium nickel manganese oxides include but are not limited to $LiN_{i0.5}Mn_{1.5}O_4$.

In an embodiment, a molar ratio of nickel to all transition metal elements in the positive electrode active substance is 0.5-0.9, for example, 0.5-0.8.

In an embodiment, a percentage of the positive electrode active substance in the positive electrode active substance layer 521b is 30 wt %-99.9 wt %, for example, 80%-99%, or 90%-97.5%

In an embodiment, the positive electrode active substance layer 521b further contains a second binder. The second binder includes, but is not limited to, polyolefin fluoride and/or polyolefin chloride polymer materials.

In an embodiment, the second binder may be selected from optional flexible chain modified polyvinylidene fluoride and/or chlorovinylidene fluoride. For example, the flexible chain is long-chain alkyl or alkoxy. For another example, the flexible chain is C1-C6 alkyl or alkoxy.

In an embodiment, the second binder is selected from one or more of optional butyl styrene modified polyvinylidene fluoride, optional polyethylene/propylene modified chlorovinylidene fluoride, polybutyl acrylate modified PVDF, and copolymers of polyvinylidene fluoride and butyl acrylate.

In an embodiment, the second binder is polybutyl acrylate modified PVDF, with a solubility parameter of 19 $(J/cm^3)^{1/2}$-20 $(J/cm^3)^{1/2}$, and a relative molecular mass of 1,100,000-1,300,000.

In an embodiment, a percentage of the second binder in the positive electrode active substance layer 521b is 0.05 wt %-30 wt %, for example, may be 1wt %-20 wt %, 3 wt %-10 wt %, or 4 wt %-8 wt %.

In an embodiment, the positive electrode active substance layer 521b further includes a second conductive material. The second conductive material may be selected from one or more of conductive carbon black, graphite, graphene, carbon nanotubes, and carbon nanofibers. The conductive carbon black may be known in the art and include, for example, acetylene black.

In an embodiment, a percentage of the second conductive material in the positive electrode active substance layer 521b is 0.05%-40 wt %, for example, may be 1wt %-20 wt %, 3 wt %-10wt %, or 4 wt %-8 wt %.

In an embodiment, a single-layer coating thickness $T_0$ of the dried positive electrode active substance layer 521b is 50 μm-300 μm, for example, may be 70 μm-200 μm, or 90 μm-150 μm.

In an embodiment, a single-layer thickness $T_1$ of the low-swelling adhesive layer 524, a single-layer thickness $T_2$ of the oily adhesive layer 522b, and a single-layer thickness $T_0$ of the positive electrode active substance layer 521b satisfy the following relation: $0.01 \leq (T_1+T_2)/T_0 \leq 0.4$. For example, $T_0$, $T_1$, and $T_2$ satisfy the following relations: $0.015 \leq (T_1+T_2)/T_0 \leq 0.2$, $0.02 \leq (T_1+T_2)/T_0 \leq 0.13$, $0.02 \leq (T_1+T_2)/T_0 \leq 0.07$, $0.02 \leq (T_1+T_2)/T_0 \leq 0.05$, $0.04 \leq (T_1+T_2)/T_0 \leq 0.2$, $0.04 \leq (T_1+T_2)/T_0 \leq 0.13$, $0.04 \leq (T_1+T_2)/T_0 \leq 0.07$, $0.05 \leq (T_1+T_2)/T_0 \leq 0.2$, or $0.05 \leq (T_1+T_2)/T_0 \leq 0.13$.

Electrolyte

Specific types and compositions of the electrolyte for the lithium-ion battery 5 of this disclosure are not limited, and may be selected according to actual requirements. In an embodiment of this disclosure, the electrolyte for the lithium-ion battery 5 is a lithium salt solution. In a specific embodiment of this disclosure, the lithium salt includes, but is not limited to, one or more of an inorganic lithium salt such as $LiClO_4$, $LiPF_6$, $LiBF_4$, $LiAsF_6$, or $LiSbF_6$ or an organic lithium salt such as $LiCF_3SO_3$, $LiCF_3CO_2$, $Li_2C_2F_4(SO_3)_2$, $LiN(CF_3SO_2)_2$, $LiC(CF_3SO_2)_3$, or $LiC_nF_{2n+1}SO_3$ ($n \geq 2$).

Non-Aqueous Organic Solvent

The non-aqueous organic solvent used for the electrolyte of this disclosure includes, but is not limited to, for example, one or more of cyclic carbonate such as ethylene carbonate, propylene carbonate, butylene carbonate, and vinylene carbonate, chain carbonate such as dimethyl carbonate, diethyl carbonate, and methyl ethyl carbonate, chain ester such as methyl propionate, cyclic ester such as γ-butyrolactone, chain ether such as dimethoxyethane, diethyl ether, diethylene glycol dimethyl ether, and triethylene glycol dimethyl ether, and cyclic ether such as tetrahydrofuran and 2-methyltetrahydrofuran, and nitrile such as acetonitrile and propionitrile. When the non-aqueous organic solvent of this disclosure is a mixed solvent, there is no special requirement for a volume fraction of each component, which can be adjusted according to conditions provided that the technical solutions of this disclosure can be implemented.

In an embodiment of this disclosure, a solubility parameter $SP_0$ of the non-aqueous organic solvent is 20 $(J/cm^3)^{1/2}$-25 $(J/cm^3)^{1/2}$, for example may be 20 $(J/cm^3)^{1/2}$-24 $(J/cm^3)^{1/2}$, 23 $(J/cm^3)^{1/2}$-25 $(J/cm^3)^{1/2}$, or 23 $(J/cm^3)^{1/2}$-24 $(J/cm^3)^{1/2}$.

Lithium-Ion Battery

The lithium-ion battery 5 provided in the first aspect of this disclosure includes the foregoing positive electrode plate and the electrolyte, as well as a negative electrode plate, and a separator arranged between the positive electrode plate and the negative electrode plate. There are no special requirements for the negative electrode plate and the separator, which can be selected according to actual needs provided that the technical solutions of this disclosure can be implemented.

The lithium-ion battery 5 of this disclosure may be a capacitor, a primary battery, or a secondary battery, for example, may be a lithium-ion capacitor, a lithium-ion primary battery, or a lithium-ion secondary battery.

Figure 3:
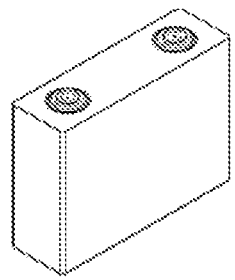
FIG. 3 is a three-dimensional diagram of a lithium-ion battery according to an embodiment of this disclosure.
Figure 4:
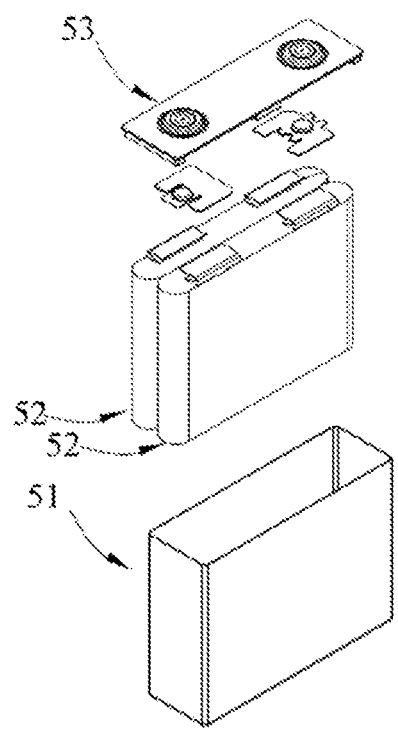
FIG. 4 is an exploded view of FIG. 3.

FIG. 3 is a three-dimensional diagram of a lithium-ion battery 5 according to an embodiment of this disclosure. FIG. 4 is an exploded view of the lithium-ion battery 5 in FIG. 3. Referring to FIG. 3 and FIG. 4, the lithium-ion battery 5 of this disclosure includes an outer package 51, an electrode assembly 52, a top cover assembly 53, and an electrolyte (not shown). The electrode assembly 52 is accommodated in the outer package 51. A quantity of the electrode assemblies 52 is not limited, and may be one or more.

It should be noted that the lithium-ion battery 5 in FIG. 3 is a tank type battery, but is not limited thereto in this disclosure. The lithium-ion battery 5 may be a bag type battery, which means that the housing 51 is replaced with a metal plastic film and the top cover assembly 53 is eliminated.

Figure 5:
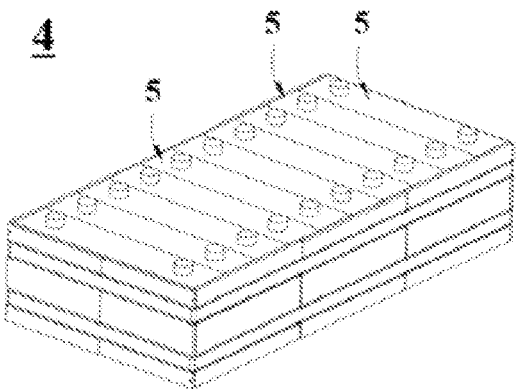
FIG. 5 is a three-dimensional diagram of a battery module according to an embodiment of this disclosure.

In an embodiment, the lithium-ion batteries 5 may be assembled into a battery module 4, and the battery module 4 may include a plurality of lithium-ion batteries 5. The specific quantity may be adjusted according to the use case and capacity of the battery module 4. FIG. 5 is a three-dimensional diagram of a battery module 4 according to an embodiment of this disclosure. Referring to FIG. 5, in the battery module 4, a plurality of lithium-ion batteries 5 may be sequentially arranged in a length direction of the battery module 4. Certainly, the batteries may alternatively be arranged in any other manner. Further, the plurality of lithium-ion batteries 5 may be fixed by fasteners. Optionally, the battery module 4 may further include a housing with an accommodating space, and the plurality of lithium-ion batteries 5 are accommodated in the accommodating space.

Figure 6:
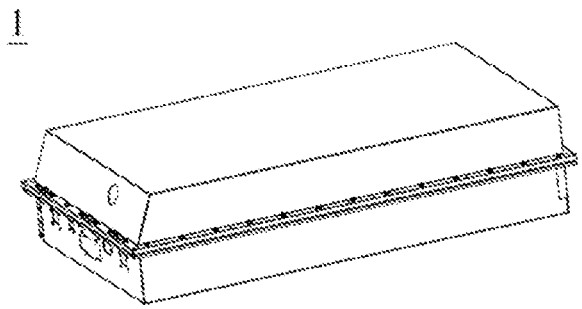
FIG. 6 is a three-dimensional diagram of a battery pack according to an embodiment of this disclosure.
Figure 7:
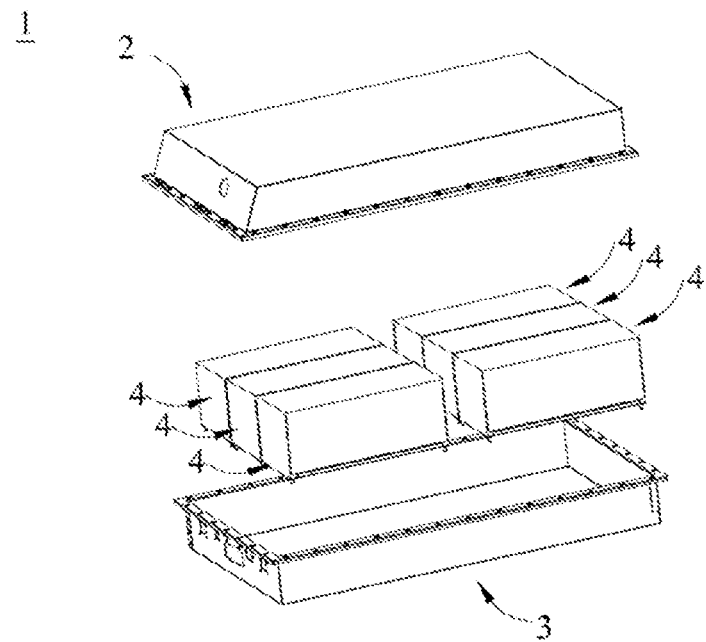
FIG. 7 is an exploded view of FIG. 6.

In an embodiment, the battery modules 4 may be further assembled into a battery pack 1, and a quantity of battery modules 4 included in the battery pack 1 may be adjusted based on disclosure and capacity of the battery pack 1. FIG. 6 is a three-dimensional diagram of a battery pack 1 according to an embodiment of this disclosure. FIG. 7 is an exploded view of FIG. 6. Referring to FIG. 6 and FIG. 7, the battery pack 1 may include a battery box and a plurality of battery modules 4 arranged in the battery box. The battery box includes an upper box body 2 and a lower box body 3. The upper box body 2 can cover the lower box body 3 to form enclosed space for accommodating the battery modules 4. The plurality of battery modules 4 may be arranged in the battery box in any manner.

Apparatus

A second aspect provides an apparatus, which contains the lithium-ion battery 5 in the first aspect of this disclosure. The lithium-ion battery 5 may be used as a power source for the apparatus, or an energy storage unit of the apparatus. The apparatus includes, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A lithium-ion battery 5, a battery module 4, or a battery pack 1 may be selected for the apparatus according to requirements for using the apparatus.

Figure 8:
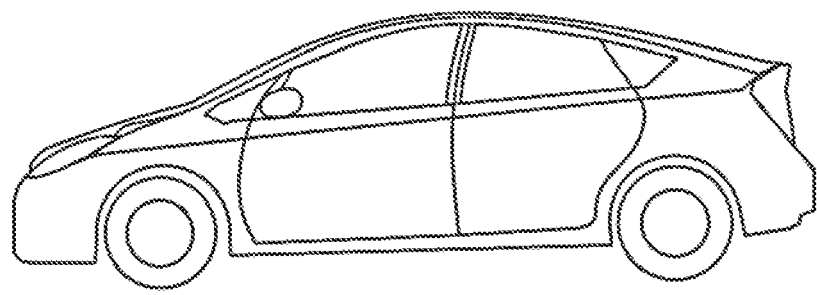
FIG. 8 is a schematic diagram of an apparatus using a lithium-ion battery as a power source according to an embodiment of this disclosure.

FIG. 8 is a schematic diagram of an apparatus using a lithium-ion battery 5 as a power source according to an embodiment of this disclosure. The apparatus may be a battery electric vehicle, a hybrid electric vehicle, a plug-in hybrid electric vehicle, or the like. To meet a requirement of the apparatus for high power and a high energy density of the lithium-ion battery 5, a battery pack 1 or a battery module 4 may be used.

In another example, the apparatus may be a mobile phone, a tablet computer, a notebook computer, or the like. The apparatus is generally required to be light and thin, and may use the lithium-ion battery 5 of this disclosure as a power source.

A person skilled in the art may understand that the foregoing definitions or preferred ranges of component selection, component content, and material physicochemical performance parameters in electrode plates, electrode active substance layers, and the like in different embodiments of this disclosure may be randomly combined, and various embodiments obtained through the combination shall still fall within the scope of this disclosure and shall be considered as a part of content disclosed in this specification.

Unless otherwise specified, various parameters in this specification have general meanings well known in the art, and may be measured by using a method well known in the art. For example, a test may be conducted in a method provided in an example of this disclosure. In addition, preferred ranges and options of different parameters provided in various preferred embodiments may be randomly combined, and it is considered that various combinations obtained shall fall within the disclosed scope of this disclosure.

EXAMPLES

This disclosure is further described with reference to specific examples. It should be understood that the following illustrative examples are only intended for illustration but not to limit this disclosure. Unless otherwise stated, all reagents used in the embodiments are commercially available or synthesized in a conventional manner, and can be used directly without further processing. Experimental conditions not specified in examples are conventional conditions, or conditions recommended by material suppliers or equipment suppliers.

1. Preparation of Positive Electrode Plate
    (1) Low-Swelling Adhesive Layer
    At room temperature, a sand mill was used, a low-swelling binder and a conductive carbon material were dispersed and stirred in an organic solvent according to a stoichiometric ratio to obtain a low-swelling slurry with good dispersion uniformity.
    The low-swelling adhesive slurry prepared above was applied to a surface of a positive electrode current collector 523b (for example, aluminum foil of 10 μm) through a transfer coating machine at a speed of 30 m/min to obtain a low-swelling adhesive layer 524.

(2) Oily Adhesive Layer
    A dual planetary mixer was used to disperse and stir a first binder, a first conductive material, and an inorganic filler in N-methylpyrrolidone (NMP) according to a stoichiometric ratio to obtain an oily adhesive slurry with good dispersion uniformity.
    The oily adhesive slurry prepared above was coated on the foregoing low-swelling adhesive layer 524 by extrusion coating at a speed of 10 m/min-60 m/min to obtain an oily adhesive layer 522b.

(3) Positive Electrode Active Substance Layer
    A positive electrode active substance ($LiNi_{0.8}Co_{0.1}Mn_{0.1}O_2$), a second binder, and a second conductive material carbon black (SP) were dissolved in a solvent N-methylpyrrolidone (NMP) according to a stoichiometric ratio, and were stirred at a high speed to obtain a uniformly dispersed positive electrode slurry. A percentage of solids in the slurry was 60 wt %, and the solids included 90 wt % $LiNi_{0.8}Co_{0.1}Mn_{0.1}O_2$, 5 wt % polybutyl acrylate modified PVDF and 5 wt % SP. The positive electrode slurry was further applied to and rolled on the foregoing oily adhesive layer 522b to obtain a positive electrode plate, where a single-layer thickness of the positive electrode active substance layer 521b was 150 μm.

2. Preparation of Negative Electrode Plate
    A negative electrode active substance artificial graphite, a binder SBR emulsion, a powder sodium carboxymethyl cellulose, and conductive carbon black were stirred at a high speed in a deionized water system according to a stoichiometric ratio to obtain a uniformly dispersed negative electrode slurry. A percentage of solids in the slurry was 40 wt %, and the solids included 90 wt % artificial graphite, 2 wt % sodium carboxymethyl cellulose, 3 wt % conductive carbon black, and 5 wt % SBR. The negative electrode slurry was applied and rolled to obtain a negative electrode plate.

3. Preparation of Lithium-Ion Electrolyte
    In a glove box filled with argon gas, ethylene carbonate (EC), dimethyl carbonate (DMC) and 1,2-propanediol carbonate were mixed in a volume ratio of 1:1:1 as a non-aqueous mixed organic solvent, with a solubility parameter of 23 $(J/cm^3)^{1/2}$-24 $(J/cm^3)^{1/2}$, then lithium hexafluorophosphate was added to the non-aqueous mixed organic solvent to obtain a 1 mol/L lithium hexafluorophosphate solution as the lithium-ion electrolyte.

4. Preparation of Lithium-Ion Battery 5
    After the positive and negative electrode plates obtained above was subjected to tab forming, they were separated by a polypropylene/polyethylene composite separator with a thickness of 12 μm, and then were coiled by a sandwich structure to form a bare cell, which was then encapsulated with an aluminum plastic film. After encapsulation, the lithium-ion electrolyte prepared above was injected, and then subjected to formation and aging.

Example 1

The positive electrode plate and the lithium-ion battery 5 in this example were prepared according to the above method. The low-swelling binder was selected from polyacrylic acid with a relative molecular mass of 300,000 and a solubility parameter of 14 $(J/cm^3)^{1/2}$-15 $(J/cm^3)^{1/2}$. The first binder in the oily adhesive layer 522b was selected from polyacrylic acid modified PVDF, with a solubility parameter of 23 $(J/cm^3)^{1/2}$-24 $(J/cm^3)^{1/2}$ and a relative molecular mass of 1,000,000. The second binder in the positive electrode active substance layer 521b was selected from polybutyl acrylate modified PVDF, with a solubility parameter of 19 $(J/cm^3)^{1/2}$-20 $(J/cm^3)^{1/2}$ and a relative molecular mass of 1,100,000-1,300,000.

The prepared positive electrode plate is shown in FIG. 2A, including the positive electrode current collector 523b, and two surfaces of the positive electrode current collector 523b were sequentially coated with the low-swelling adhesive layer 524, the oily adhesive layer 522b, and the positive electrode active substance layer 521b.

Example 2

The positive electrode plate and the lithium-ion battery 5 in this example were prepared according to the above method. The low-swelling binder was selected from polyacrylate, with a relative molecular mass of 500,000 and a solubility parameter of 16 $(J/cm^3)^{1/2}$-18 $(J/cm^3)^{1/2}$. The first binder in the oily adhesive layer 522b was selected from polyacrylic acid modified PVDF, with a solubility parameter of 23 $(J/cm^3)^{1/2}$-24 $(J/cm^3)^{1/2}$ and a relative molecular mass of 1,000,000. The second binder in the positive electrode active substance layer 521b was selected from polybutyl acrylate modified PVDF, with a solubility parameter of 19 $(J/cm^3)^{1/2}$-20 $(J/cm^3)^{1/2}$ and a relative molecular mass of 1,100,000-1,300,000.

According to the positive electrode plate prepared in this example, two surfaces of the positive electrode current collector 523b were sequentially coated with the low-swelling adhesive layer 524, the oily adhesive layer 522b, and the positive electrode active substance layer 521b.

Example 3

The positive electrode plate and the lithium-ion battery 5 in this example were prepared according to the above method. The low-swelling binder was selected from polystyrene or propylene modified acrylate, with a relative molecular mass of 800,000 and a solubility parameter of 13 $(J/cm^3)^{1/2}$-14 $(J/cm^3)^{1/2}$. The first binder in the oily adhesive layer 522b was selected from polyacrylic acid modified PVDF, with a solubility parameter of 20 $(J/cm^3)^{1/2}$-22 $(J/cm^3)^{1/2}$ and a relative molecular mass of 1,300,000. The second binder in the positive electrode active substance layer 521b was selected from polybutyl acrylate modified PVDF, with a solubility parameter of 19 $(J/cm^3)^{1/2}$-20 $(J/cm^3)^{1/2}$ and a relative molecular mass of 1,100,000-1,300,000.

According to the positive electrode plate prepared in this example, as shown in FIG. 2B, one surface of the positive electrode current collector 523b was coated with the low-swelling adhesive layer 524, the oily adhesive layer 522b, and the positive electrode active substance layer 521b sequentially.

Example 4

The positive electrode plate and the lithium-ion battery 5 in this example were prepared according to the above method. The low-swelling binder was selected from polystyrene or propylene modified acrylate, with a relative molecular mass of 800,000 and a solubility parameter of 13 $(J/cm^3)^{1/2}$-14 $(J/cm^3)^{1/2}$. The first binder in the oily adhesive layer 522b was selected from polyacrylic acid modified PVDF, with a solubility parameter of 27 $(J/cm^3)^{1/2}$-29 $(J/cm^3)^{1/2}$ and a relative molecular mass of 800,000. The second binder in the positive electrode active substance layer 521b was selected from polybutyl acrylate modified PVDF, with a solubility parameter of 19 $(J/cm^3)^{1/2}$-20 $(J/cm^3)^{1/2}$ and a relative molecular mass of 1,100,000-1,300,000.

According to the positive electrode plate prepared in this example, two surfaces of the positive electrode current collector 523b were sequentially coated with the low-swelling adhesive layer 524, the oily adhesive layer 522b, and the positive electrode active substance layer 521b.

Example 5

A difference between this example and Example 4 was that a percentage of the low-swelling binder in the low-swelling adhesive layer 524 was 40 wt %.

Example 6

A difference between this example and Example 4 was that a percentage of the low-swelling binder in the low-swelling adhesive layer was 80 wt %.

Example 7

A difference between this example and Example 4 was that percentages of the first binder, the first conductive material, and the inorganic filler in the oily adhesive layer 522b were 40 wt %, 20 wt %, and 40 wt %, respectively.

Example 8

A difference between this example and Example 4 was that percentages of the first binder, the first conductive material, and the inorganic filler in the oily adhesive layer 522b were 75 wt %, 20 wt %, and 5 wt %, respectively.

Example 9

A difference between this example and Example 4 was that percentages of the first binder, the first conductive material, and the inorganic filler in the oily adhesive layer 522b were 40 wt %, 55 wt %, and 5 wt %, respectively.

Example 10

A difference between this example and Example 4 was that percentages of the first binder, the first conductive material, and the inorganic filler in the oily adhesive layer 522b were 50 wt %, 40 wt %, and 10 wt %, respectively.

Example 11

A difference between this example and Example 4 was that a thickness of the low-swelling adhesive layer 524 was 100 μm, and a thickness of the oily adhesive layer 522b was 3 μm.

Example 12

A difference between this example and Example 4 was that a thickness of the low-swelling adhesive layer 524 was 1 μm, and a thickness of the oily adhesive layer 522b was 5 μm.

Example 13

A difference between this example and Example 4 was that a thickness of the low-swelling adhesive layer 524 was 3 μm, and a thickness of the oily adhesive layer 522*b* was 7 μm.

Example 14

A difference between this example and Example 4 was that a thickness of the low-swelling adhesive layer 524 was 5 μm, and a thickness of the oily adhesive layer 522*b* was 15 μm.

Comparative Example 1

The positive electrode plate and the lithium-ion battery 5 in Comparative Example 1 were prepared according to the above method. In comparative Example 1, the low-swelling adhesive layer 524 was not included. The first binder in the oily adhesive layer 522*b* was selected from polyacrylic acid modified PVDF, with a solubility parameter of 23 $(J/cm^3)^{1/2}$-24 $(J/cm^3)^{1/2}$ and a relative molecular mass of 1,000,000. The second binder in the positive electrode active substance layer 521*b* was selected from polybutyl acrylate modified PVDF, with solubility parameter of 19 $(J/cm^3)^{1/2}$-20 $(J/cm^3)^{1/2}$, and a relative molecular mass of 1,100,000-1,300,000.

As shown in FIG. 1, the prepared positive electrode plate included the positive electrode current collector 523*a*, and a surface of the positive electrode current collector 523*a* was sequentially coated with the oily adhesive layer 522*a* and the positive electrode active substance layer 521*a*.

Comparative Example 2

The positive electrode plate and the lithium-ion battery 5 in Comparative Example 2 were prepared according to the above method. The positive electrode current collector 523*b* in Comparative Example 2 was coated with only the positive electrode active substance layer 521*b*. The second binder in the positive electrode active substance layer 521*b* was polybutyl acrylate modified PVDF, with a solubility parameter of 19 $(J/cm^3)^{1/2}$-20 $(J/cm^3)^{1/2}$ and a relative molecular mass of 1,100,000-1,300,000.

In the positive electrode plate prepared in this comparative example, only one surface of the positive electrode current collector 523*b* was coated with the positive electrode active substance layer 521*b*.

Comparative Example 3

The positive electrode plate and the lithium-ion battery 5 in Comparative Example 3 were prepared according to the above method. The low-swelling adhesive layer 524 and the oily adhesive layer 522*b* were sequentially arranged on a surface of the positive electrode current collector 523*b*. The low-swelling adhesive layer 524 was selected from polyacrylic acid modified PVDF, with a solubility parameter of 27 $(J/cm^3)^{1/2}$-29 $(J/cm^3)^{1/2}$ and a relative molecular mass of 800,000. The first binder of the oily adhesive layer 522*b* was selected from polystyrene or propylene modified acrylate, with a relative molecular mass of 800,000 and a solubility parameter of 13 $(J/cm^3)^{1/2}$-14 $(J/cm^3)^{1/2}$. The second binder in the positive electrode active substance layer 521*b* was selected from polybutyl acrylate modified PVDF, with a solubility parameter of 19 $(J/cm^3)^{1/2}$-20 $(J/cm^3)^{1/2}$, and a relative molecular mass of 1,100,000-1,300,000.

Table 1 shows percentages and specific parameters of substances in Examples 1 to 14 and Comparative Examples 1 to 3.

TABLE 1

| | Low-swelling adhesive layer | | | | | | Oily adhesive layer | |
| | Low-swelling binder | | | | | | | |
| | | | Solubility | | Conductive | | First binder | |
| | Specific substance | Relative molecular mass | parameter $SP_1$ $(J/cm^3)^{1/2}$ | Percentage (wt %) | material and perentage (wt %) | | Thickness $T_1$ (μm) | Specifice substance | Relative molecular mass |
|---|---|---|---|---|---|---|---|---|---|
| Example 1 | Polyacrylic acid | 300,000 | 14-15 | 60 | Conductive carbon black | 40 | 2 | Polyacrylic acid modified PVDF | 1,000,000 |
| Example 2 | Polyacrylate | 500,000 | 16-18 | 60 | Conductive carbon black | 40 | 2 | Polyacrylic acid modified PVDF | 1,000,000 |
| Example 3 | Polystyrene or propylene modified acrylate | 800,000 | 13-14 | 60 | Conductive carbon black | 40 | 2 | Polyacrylic acid modified PVDF | 1,300,000 |
| Example 4 | Polystyrene or propylene modified acrylate | 800,000 | 13-14 | 60 | Conductive carbon black | 40 | 2 | Polyacrylic acid modified PVDF | 800,000 |
| Example 5 | Polystyrene or propylene modified acrylate | 800,000 | 13-14 | 40 | Conductive carbon black | 60 | 2 | Polyacrylic acid modified PVDF | 800,000 |
| Example 6 | Polystyrene or propylene modified acrylate | 800,000 | 13-14 | 80 | Conductive carbon black | 20 | 2 | Polyacrylic acid modified PVDF | 800,000 |

TABLE 1-continued

| | | | | | | | | | |
|---|---|---|---|---|---|---|---|---|---|
| Example 7 | Polystyrene or propylene modified acrylate | 800,000 | 13-14 | 60 | Conductive carbon black | 40 | 2 | Polyacrylic acid modified PVDF | 800,000 |
| Example 8 | Polystyrene or propylene modified acrylate | 800,000 | 13-14 | 60 | Conductive carbon black | 40 | 2 | Polyacrylic acid modified PVDF | 800,000 |
| Example 9 | Polystyrene or propylene modified acrylate | 800,000 | 13-14 | 60 | Conductive carbon black | 40 | 2 | Polyacrylic acid modified PVDF | 800,000 |
| Example 10 | Polystyrene or propylene modified acrylate | 800,000 | 13-14 | 60 | Conductive carbon black | 40 | 2 | Polyacrylic acid modified PVDF | 800,000 |
| Example 11 | Polystyrene or propylene modified acrylate | 800,000 | 13-14 | 60 | Conductive carbon black | 40 | 0.1 | Polyacrylic acid modified PVDF | 800,000 |
| Example 12 | Polystyrene or propylene modified acrylate | 800,000 | 13-14 | 60 | Conductive carbon black | 40 | 1 | Polyacrylic acid modified PVDF | 800,000 |
| Example 13 | Polystyrene or propylene modified acrylate | 800,000 | 13-14 | 60 | Conductive carbon black | 40 | 3 | Polyacrylic acid modified PVDF | 800,000 |
| Example 14 | Polystyrene or propylene modified acrylate | 800,000 | 13-14 | 60 | Conductive carbon black | 40 | 5 | Polyacrylic acid modified PVDF | 800,000 |
| Comparative Example 1 | / | / | / | / | / | / | / | Polyacrylic acid modified PVDF | 1,000,000 |
| Comparative Example 2 | / | / | / | / | / | / | / | / | / |
| Comparative Example 3 | Polyacrylic acid modified PVDF | 800,000 | 27-29 | 60 | Conductive carbon black | 40 | 2 | Polystyrene or propylene modified acrylate | 800,000 |

| | Oily Adhesive layer | | | | | |
|---|---|---|---|---|---|---|
| | First binder | | First conductive polymer material and percentage (wt %) | Inorganic filler and percentage (wt %) | Thickness $T_2$ (μm) | $(T_1 + T_2)/T_0$ |
| | Solubility parameter $SP_2$ $(J/cm^3)^{1/2}$ | Percentage (wt %) | | | | |
| Example 1 | 23-24 | 60 | Conductive carbon black 20 | Alumina 20 | 5 | 0.05 |
| Example 2 | 23-24 | 60 | Conductive carbon black 20 | Alumina 20 | 5 | 0.05 |
| Example 3 | 20-22 | 60 | Conductive carbon black 20 | Alumina 20 | 5 | 0.05 |
| Example 4 | 27-29 | 60 | Conductive carbon black 20 | Alumina 20 | 5 | 0.05 |
| Example 5 | 27-29 | 60 | Conductive carbon black 20 | Alumina 20 | 5 | 0.05 |
| Example 6 | 27-29 | 60 | Conductive carbon black 20 | Alumina 20 | 5 | 0.05 |
| Example 7 | 27-29 | 40 | Conductive carbon black 20 | Alumina 40 | 5 | 0.05 |
| Example 8 | 27-29 | 75 | Conductive carbon black 20 | Alumina 5 | 5 | 0.05 |
| Example 9 | 27-29 | 40 | Conductive carbon black 55 | Alumina 5 | 5 | 0.05 |

TABLE 1-continued

| | | | | | | | | |
|---|---|---|---|---|---|---|---|---|
| Example 10 | 27-29 | 50 | Conductive carbon black | 40 | Alumina | 10 | 5 | 0.05 |
| Example 11 | 27-29 | 60 | Conductive carbon black | 20 | Alumina | 20 | 3 | 0.02 |
| Example 12 | 27-29 | 60 | Conductive carbon black | 20 | Alumina | 20 | 5 | 0.04 |
| Example 13 | 27-29 | 60 | Conducteiv carbon black | 20 | Alumina | 20 | 7 | 0.07 |
| Example 14 | 27-29 | 60 | Conductive carbon black | 20 | Alumina | 20 | 15 | 0.13 |
| Comparative Example 1 | 23-24 | 60 | Conductive carbon black | 20 | Alumina | 20 | 5 | / |
| Comparative Example 2 | / | / | / | / | / | / | / | / |
| Comparative Example 3 | 13-14 | 60 | Conductive carbon black | 20 | Alumina | 20 | 5 | 0.05 |

Performance Test

1. Swelling Property Test of Different Adhesive Layers in a Lithium-Ion Electrolyte The low-swelling adhesive slurry and the oily adhesive slurry in Example 1 were diluted into 7 wt % adhesive separately, then poured into a simple box made of aluminum plastic film, and dried in an oven at 80° C. for 6 hours, to obtain adhesive films of the low-swelling adhesive layer 524 and the oily adhesive layer 522b, respectively.

The different adhesive films prepared above were placed in the lithium-ion electrolyte, and then subjected to standing in an oven at 70° C., and weight changes of the adhesive films were monitored for one week. The results are shown in FIG. 9.

Figure 9:
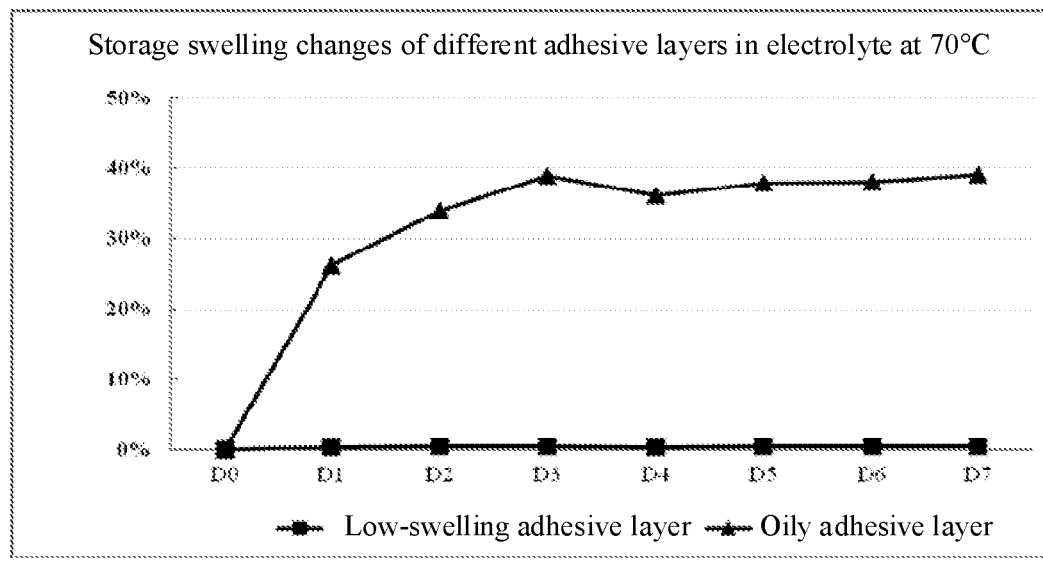
FIG. 9 shows swelling property test results of different adhesive layers in a lithium-ion electrolyte.

It can be seen from FIG. 9 that, compared with the oily adhesive layer 522b, the low-swelling adhesive layer 524 has better electrolyte resistance. After soaking in electrolyte for one week, the weight changes were all ≤1%, while a swelling change of the oily adhesive layer 522b was up to 30%-40%.

2. Separator Resistance Test Before and After Soaking

Figure 10:
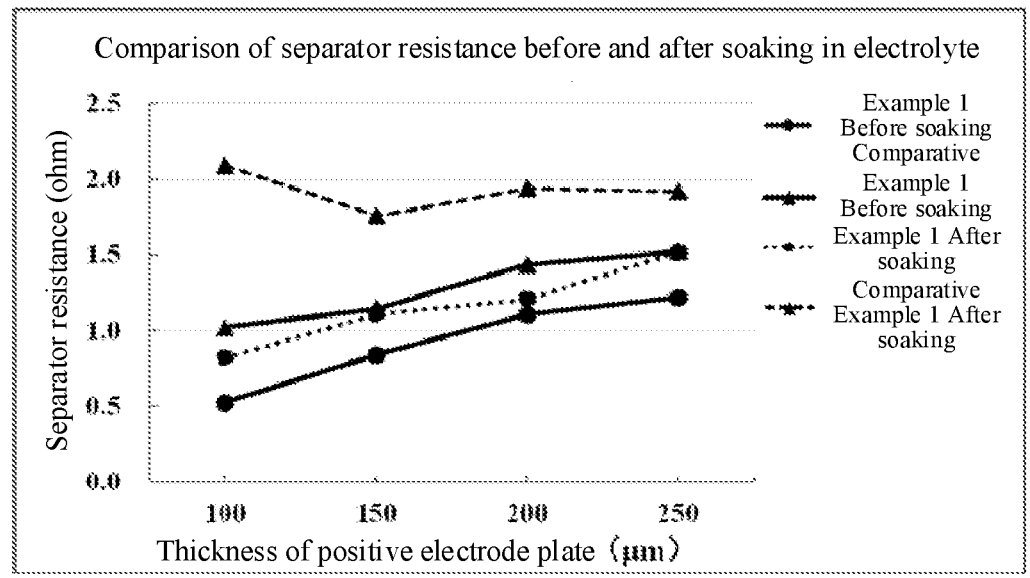
FIG. 10 shows resistance test results of a separator before and after soaking.

Five positive electrode plates (20×90 mm$^2$) with different thicknesses (100 μm, 150 μm, 200 μm, 250 μm) prepared in Example 1 and Comparative Example 1 were taken and placed in the lithium-ion electrolyte prepared above, then subjected to standing at 70° C. for 24 h, and were taken out and dried for 0.5 h in a drying room environment. A separator resistance tester was used, the separator resistance on two sides of each positive electrode plate were read every 10s, 20 values were recorded for each sample, and average values were obtained. Refer to FIG. 10 for the results.

It can be seen from FIG. 10 that under soaking of the lithium-ion electrolyte at 70° C., there are significant differences in the change of the separator resistances of the positive electrode plates with different coating thicknesses and different coating structures. Before soaking, compared with a single-layer coating structure (that is, only having the positive electrode active substance layer 521b, in Comparative Example 2) and a double-layer coating structure (that is, a combination of the oily adhesive layer 522b+ the positive electrode active substance layer 521b, in Comparative Example 1), the positive electrode plate of a three-layer coating structure (that is, a combination of the low-swelling adhesive layer 524+ the oily adhesive layer 522b+ the positive electrode active substance layer 521b) of this disclosure exhibits lower resistance. This is due to an increase in conductive contact sites with the positive electrode current collector 523b. Furthermore, when the lithium-ion electrolyte penetrates a contact interface, the low-swelling adhesive layer 524 exhibits a smaller swelling rate, which can provide good bonding force and contact area between the interfaces, and ensure sufficient effective bonding force action sites and electron transfer path. It can be seen that an increase of the resistance of the positive electrode plate with the three-layer coating structure of this disclosure before/after contacting the electrolyte is significantly smaller than that of the single-layer/double-layer coating structure.

3. Bonding Force Test Before and After Soaking

Five positive electrode plates (20×90 mm$^2$) prepared in Examples 1 to 14 and Comparative Examples 1 to 3 were taken and placed in the electrolyte prepared above, then subjected to standing at 70° C. for 24 h, and were taken out and dried for 0.5 h in a drying room environment. The dried positive electrode plate was pasted on the double-sided tape, rolled for 3 times, and then subjected to a 180° peeling test, with a drawing speed of 50 mm/min. The results are shown in Table 2 below.

TABLE 2

| Positive electrode plate | Bonding force before soaking (N/m) | Bonding force after soaking (N/m) |
|---|---|---|
| Example 1 | >500 | >500 |
| Example 2 | >500 | >500 |
| Example 3 | >500 | >500 |
| Example 4 | >500 | >500 |
| Example 5 | >500 | >500 |
| Example 6 | >500 | >500 |
| Example 7 | >500 | >500 |
| Example 8 | >500 | >500 |
| Example 9 | >500 | 455 |
| Example 10 | >500 | 460 |
| Example 11 | >500 | 312 |
| Example 12 | >500 | >500 |
| Example 13 | >500 | >500 |
| Example 14 | >500 | >500 |
| Comparative Example 1 | 400 | 260 |
| Comparative Example 2 | 20 | 3.1 |

TABLE 2-continued

| Positive electrode plate | Bonding force before soaking (N/m) | Bonding force after soaking (N/m) |
|---|---|---|
| Comparative Example 3 | >500 | 220 |

It can be seen from Table 2 that the bonding force of the positive electrode plate of this disclosure before and after soaking has basically not changed, while the bonding force of the positive electrode plate in Comparative Examples 1 to 3 is obviously reduced before and after soaking.

4. DCR Test of Lithium-Ion Battery 5

The lithium-ion batteries 5 prepared in Examples 1 to 14 and the lithium-ion batteries 5 prepared in Comparative Examples 1 to 3 were subjected to a DCR test separately according to the following procedure.

At 25° C., the DCR test was performed for 30 s. A specific process was as follows:

standing at 25° C. for 5 min;

fully charging to 4.3 V at 1C current;

standing for 10 min;

discharging and adjusting under full charge to test different SOCs (90%, 60%, 50%, and 30%);

testing the corresponding DCR within 30s at a 4C current in turn (a sampling interval was 0.1 s); and standing for 10 min.

Figure 11:
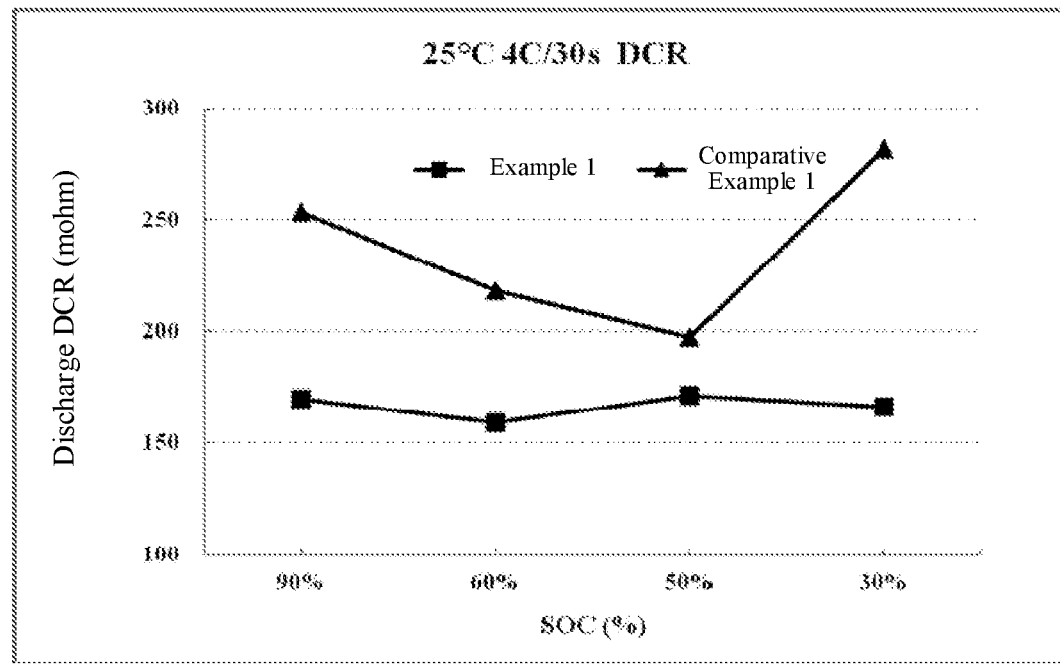
FIG. 11 shows direct-current internal resistance DCR test results of a lithium-ion battery.

See Table 3 and FIG. 11 for the results.

TABLE 3

| Battery | 25° C. 50% SOC DCR (mohm) |
|---|---|
| Example 1 | 171 |
| Example 2 | 175 |
| Example 3 | 180 |
| Example 4 | 169 |
| Example 5 | 157 |
| Example 6 | 190 |
| Example 7 | 176 |
| Example 8 | 182 |
| Example 9 | 173 |
| Example 10 | 174 |
| Example 11 | 185 |
| Example 12 | 172 |
| Example 13 | 165 |
| Example 14 | 150 |
| Comparative Example 1 | 197 |
| Comparative Example 2 | 302 |
| Comparative Example 3 | 263 |

It can be seen from Table 3 and FIG. 11 that, compared with Comparative Examples 1 to 3, the DCR of the lithium-ion battery 5 of this disclosure was reduced to varying degrees. DCR in Example 14 was 23.8% lower than that in Comparative Example 1, and was 50% lower than that in Comparative Example 2.

According to the disclosure and teaching of this specification, those skilled in the art may further make changes or modifications to the foregoing embodiments. Therefore, the present invention is not limited to the specific implementations disclosed and described above. Some changes and modifications to the present invention shall also fall within the protection scope of the claims of the present invention. In addition, although certain terms are used in the specification, these terms are merely used for ease of description and do not constitute any limitation on the present invention.

What is claimed is:

1. A lithium-ion battery, comprising:
a positive electrode plate comprising a positive electrode current collector and a positive electrode active substance layer; and
an electrolyte comprising a non-aqueous organic solvent; and, wherein
an adhesive layer and an oily adhesive layer are sequentially arranged between the positive electrode current collector and the positive electrode active substance layer, wherein
the adhesive layer comprises a binder, the binder comprises polystyrene or propylene modified acrylate, and the oily adhesive layer comprises a first binder selected from one or more of carboxylic acid modified polyvinylidene fluoride PVDF and carboxylic acid modified polyvinylidene chloride PVDC, wherein a solubility parameter $SP_1$ of the binder is less than a solubility parameter $SP_2$ of the first binder,
the solubility parameter $SP_1$ of the binder is 13 $(J/cm^3)^{1/2}$–18$(J/cm^3)^{1/2}$.

2. The lithium-ion battery according to claim 1, wherein the solubility parameter $SP_1$ of the binder is less than a solubility parameter $SP_0$ of the non-aqueous organic solvent; and/or
an absolute value of a difference between the solubility parameter $SP_2$ of the first binder and the solubility parameter $SP_0$ of the non-aqueous organic solvent is ≤5 $(J/cm^3)^{1/2}$.

3. The lithium-ion battery according to claim 2, wherein the solubility parameter $SP_0$ of the non-aqueous organic solvent is 20 $(J/cm^3)^{1/2}$–25$(J/cm^3)^{1/2}$.

4. The lithium-ion battery according to claim 1, wherein the solubility parameter $SP_2$ of the first binder is 20 $(J/cm^3)^{1/2}$–29$(J/cm^3)^{1/2}$.

5. The lithium-ion battery according to claim 1, wherein in the adhesive layer, a percentage of the binder is ≥40 wt %.

6. The lithium-ion battery according to claim 1, wherein the adhesive layer further comprises a conductive carbon material, and the conductive carbon material is selected from one or more of conductive carbon black and graphene.

7. The lithium-ion battery according to claim 1, wherein the carboxylic acid of the carboxylic acid modified polyvinylidene chloride PVDC is selected from acrylic acid and polyacrylic acid.

8. The lithium-ion battery according to claim 1, wherein the oily adhesive layer further comprises a first conductive material, and the first conductive material is selected from one or more of conductive carbon black, graphene, polypyrrole, and polyaniline.

9. The lithium-ion battery according to claim 1, wherein the oily adhesive layer further comprises an inorganic filler, and the inorganic filler is selected from one or more of magnesium oxide, aluminum oxide, titanium dioxide, zirconium oxide, silicon dioxide, silicon carbide, boron carbide, calcium carbonate, aluminum silicate, calcium silicate, potassium titanate, barium sulfate, lithium cobalt oxide, lithium nickel cobalt manganese oxide, lithium nickel aluminum manganese oxide, lithium iron phosphate, lithium vanadium phosphate, lithium cobalt phosphate, lithium manganese phosphate, lithium manganese ferric phosphate, lithium iron silicate, lithium vanadium silicate, lithium cobalt silicate, lithium manganese silicate, spinel-type lithium manganate, spinel-type lithium nickel manganate, lithium titanate, or these materials modified by conductive carbon coating, conductive metal coating, or conductive polymer coating.

10. The lithium-ion battery according to claim 1, wherein the positive electrode active substance layer comprises a positive electrode active substance, and the positive electrode active substance is selected from lithium-containing composite metal oxides; optionally, the positive electrode active substance is selected from one or more of lithium nickel cobalt manganese oxides and lithium nickel manganese oxides.

11. The lithium-ion battery according to claim 1, wherein the positive electrode active substance layer further comprises a binder selected from flexible chain modified polyvinylidene fluoride and chlorovinylidene fluoride, wherein the flexible chain is long-chain alkyl or alkoxy.

12. The lithium-ion battery according to claim 1, wherein a single-layer thickness $T_1$ of the adhesive layer, a single-layer thickness $T_2$ of the oily adhesive layer, and a single-layer thickness of the positive electrode active substance layer $T_0$ satisfy:

$0.01 \leq (T_1+T_2)/T_0 \leq 0.4$.

13. The lithium-ion battery according to claim 1, wherein a single-layer thickness $T_2$ of the adhesive layer is 0.1 μm-5 μm.

14. The lithium-ion battery according to claim 1, wherein a single-layer thickness $T_2$ of the oily adhesive layer is 3 μm-15 μm.

15. An apparatus, comprising the lithium-ion battery according to claim 1.

16. The apparatus according to claim 15, wherein the apparatus comprises a mobile phone, a notebook computer, an electric vehicle, an electric vessel, or an energy storage system; optionally, the electric vehicle comprises a hybrid electric vehicle, a plug-in hybrid electric vehicle, an electric bicycle, an electric scooter, an electric golf cart, or an electric truck.

17. The lithium-ion battery according to claim 1, wherein the first binder of the oily adhesive layer is carboxylic acid modified polyvinylidene chloride PVDC.

* * * * *